United States Patent
Deuker et al.

(10) Patent No.: US 9,086,219 B2
(45) Date of Patent: Jul. 21, 2015

(54) METHOD AND DEVICE FOR REGULATING THE OPERATING LINE OF A GAS TURBINE COMBUSTION CHAMBER

(75) Inventors: Eberhard Deuker, Mülheim an der Ruhr (DE); Stefan Pernau, Essen (DE); Siegfried Bode, Mülheim an der Ruhr (DE); Andreas Diebels, Bottrop (DE); Thomas Hahner, Düsseldorf (DE); Thomas Hesse, Berlin (DE); Werner Krebs, Mülheim an der Ruhr (DE); Bernd Prade, Mülheim an der Ruhr (DE); Peter-Andreas Schneider, Münster (DE); Dieter Simon, Mülheim an der Ruhr (DE); Berthold Sturm, Brakel (DE); Heinrich Thölking, Vechta (DE); Dieter Warnack, Berlin (DE); Andreas Bauer, Grevenbroich (DE); Joachim Lepers, Düsseldorf (DE); Martin Müller, Mülheim an der Ruhr (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 1499 days.

(21) Appl. No.: 11/920,396
(22) PCT Filed: May 10, 2006
(86) PCT No.: PCT/EP2006/062183
§ 371 (c)(1),
(2), (4) Date: Feb. 17, 2009
(87) PCT Pub. No.: WO2006/120206
PCT Pub. Date: Nov. 16, 2006

(65) Prior Publication Data
US 2009/0301097 A1    Dec. 10, 2009

(30) Foreign Application Priority Data
May 13, 2005   (EP) ..................................... 05010543

(51) Int. Cl.
F02C 9/28   (2006.01)
F23R 3/34   (2006.01)
(Continued)

(52) U.S. Cl.
CPC . *F23R 3/343* (2013.01); *F02C 9/28* (2013.01); *F02C 9/50* (2013.01); *F02C 9/54* (2013.01);
(Continued)

(58) Field of Classification Search
CPC ................ F23N 2041/20; F23N 5/003; F05D 2270/083; F02C 9/00; F02C 9/28
USPC .............. 60/39.27, 39.281, 39.822, 725, 740, 60/773, 777, 794, 800, 803; 701/100
See application file for complete search history.

(56) References Cited

U.S. PATENT DOCUMENTS 4,041,694 A * 8/1977 Lewis .............................. 60/772
5,117,624 A * 6/1992 Roberts et al. .................. 60/796

(Continued)

FOREIGN PATENT DOCUMENTS

EP          0 677 706 A1    10/1995
EP          0 962 704 A2    12/1999
(Continued)

*Primary Examiner* — Ehud Gartenberg
*Assistant Examiner* — Steven Sutherland

(57) ABSTRACT

A regulating device for regulating the course of a gas turbine plant has at least one sensor for sensing a measurement variable and for outputting a measurement signal which represents the measurement variable; at least one adjusting system for influencing air and/or fuel supply to a combustion chamber of the gas turbine plant on the basis of a correcting variable; and a regulator connected to the at least one sensor so as to receive the measurement variable and to the at least one adjusting system for outputting the correcting variable, the regulator being designed to determine the correcting variable on the basis of the measurement variable received and its deviation from a pilot variable. At least one sensor is designed to sense the variation in time of at least one burner or combustion chamber parameter as measurement variable.

18 Claims, 2 Drawing Sheets

(51) Int. Cl.
  *F02C 9/50* (2006.01)
  *F02C 9/54* (2006.01)
  *F23N 1/02* (2006.01)
  *F23N 5/02* (2006.01)
  *F23N 5/16* (2006.01)
  *F23R 3/26* (2006.01)
  *F23N 5/00* (2006.01)

(52) U.S. Cl.
  CPC .. *F23N 1/02* (2013.01); *F23N 5/02* (2013.01); *F23N 5/16* (2013.01); *F23R 3/26* (2013.01); *F05D 2270/082* (2013.01); *F05D 2270/083* (2013.01); *F05D 2270/14* (2013.01); *F05D 2270/303* (2013.01); *F05D 2270/707* (2013.01); *F05D 2270/709* (2013.01); *F23N 5/003* (2013.01); *F23N 2023/14* (2013.01); *F23N 2023/48* (2013.01); *F23N 2023/52* (2013.01); *F23N 2025/04* (2013.01); *F23N 2025/08* (2013.01); *F23N 2031/08* (2013.01); *F23N 2041/20* (2013.01)

(56) References Cited

U.S. PATENT DOCUMENTS

| | | | |
|---|---|---|---|
| 5,253,471 A * | 10/1993 | Richardson | 60/804 |
| 5,636,507 A | 6/1997 | Rajamani et al. | |
| 5,921,075 A * | 7/1999 | Shimoyama et al. | 60/797 |
| 6,389,815 B1 * | 5/2002 | Hura et al. | 60/746 |
| 6,442,928 B1 * | 9/2002 | Endo et al. | 60/39.27 |
| 6,718,770 B2 * | 4/2004 | Laing et al. | 60/740 |
| 6,823,675 B2 | 11/2004 | Brunell et al. | |
| 8,733,078 B2 * | 5/2014 | Alholm | 60/39.821 |
| 2003/0140614 A1 | 7/2003 | Nearhoof, Sr. et al. | |
| 2004/0011020 A1* | 1/2004 | Nomura et al. | 60/39.281 |
| 2004/0076218 A1 | 4/2004 | Tomlinson et al. | |
| 2004/0107701 A1* | 6/2004 | Miyake et al. | 60/772 |
| 2004/0255594 A1 | 12/2004 | Baino et al. | |

FOREIGN PATENT DOCUMENTS

| | | |
|---|---|---|
| EP | 1 286 031 A1 | 2/2003 |
| EP | 1 300 566 A2 | 4/2003 |
| JP | 05098996 A | 4/1993 |
| JP | 08042361 A | 2/1996 |
| JP | 11022490 A | 1/1999 |
| JP | 2003293793 A | 10/2003 |
| JP | 2004162698 A | 6/2004 |

* cited by examiner

METHOD AND DEVICE FOR REGULATING THE OPERATING LINE OF A GAS TURBINE COMBUSTION CHAMBER

CROSS REFERENCE TO RELATED APPLICATIONS

This application is the US National Stage of International Application No. PCT/EP2006/062183, filed May 10, 2006 and claims the benefit thereof. The International Application claims the benefits of European application No. 05010543.6 filed May 13, 2005, both of the applications are incorporated by reference herein in their entirety.

FIELD OF INVENTION

The present invention relates to a regulating method and a regulating device for regulating the operating line of a gas turbine combustion chamber.

BACKGROUND OF THE INVENTION

A gas turbine is a flow machine, which generally comprises a compressor, turbine and combustion chamber section. In the compressor ambient air that has been taken in is compressed and the compressed air is then supplied to the combustion chamber section. At least one combustion chamber with at most a number of burners is disposed in the combustion chamber section, to which burners the compressed air is supplied. In addition to the compressed air a fuel is also supplied to the burners, being mixed with the air and combusted. The hot combustion waste gases resulting in the combustion chamber are supplied to the turbine, where they expand and are cooled, thereby causing the turbine to rotate. Thermal energy from the combustion gases is thus converted to mechanical work, which is used on the one hand to drive the compressor and on the other hand to drive a consuming component, for example a generator for generating power.

During combustion in the combustion chamber it should be ensured that a stable flame is present. Flame instabilities occur in particular due to resonant combustion vibration in the combustion waste gas and can lead on the one hand to increased pollutant emission and on the other hand to vibration of the combustion chamber, reducing the service life of the combustion chamber and shortening maintenance intervals.

The burners are also generally equipped not only with a main fuel supply but also with a so-called pilot fuel supply. The pilot fuel supply supplies a smaller fuel mass flow than the main fuel mass flow, to boost the flame. If necessary the flame can also be stabilized by influencing the mass flow of pilot fuel supplied.

The stability of the flame is influenced by a large number of influencing variables. Examples of such influencing variables are the ambient temperature, the density and calorific value of the fuel and also the structural state of the gas turbine plant, in particular the combustion chamber and burners. The influence of the influencing variables is compensated for by means of the fuel mass flow supplied by way of the pilot burner. In this process the pilot gas mass flow cannot be below or above certain limits, since the flame would otherwise enter a non-stable range. To keep the pilot gas mass flow within the stable flame range, a function is applied, which defines the pilot gas mass flow to be deployed as a function of the influencing variables. This function is also referred to as the pilot gas curve.

The pilot gas curve incorporates a number of gas turbine parameters. These parameters vary from one gas turbine plant to another, even between gas turbine plants of the same structure. It is particularly essential to take into account ambient conditions at the site of the gas turbine plant as well. Also the gas turbine parameters can be subject to changes over time during operation of a gas turbine plant. This may result in a time-consuming resetting or subsequent setting of the pilot gas curve being required. The setting process incurs high costs and long outage times.

In addition the influence of the influencing variables on the pilot gas curve is not adequately known from a quantitative standpoint. It is generally not possible to respond appropriately to some influencing variables.

SUMMARY OF INVENTION

The object of the present invention is therefore to provide a regulating method and regulating device, which can advantageously be deployed to prevent flame instabilities.

This object is achieved by a regulating method and a regulating device as claimed in the claims. The dependent claims contain advantageous refinements of the invention.

In the inventive regulating method for regulating the operating line of a gas turbine plant at least one controlled variable is captured, the captured controlled variable is compared with a predetermined reference variable and at least one manipulated variable is determined on the basis of the comparison. The determined manipulated variable is output to at least one adjusting facility influencing the air and/or fuel supply to a combustion chamber of the gas turbine plant. A controlled variable, from which the approach of the flame to a stability limit can be derived, hereby serves as at least one controlled variable. Changes over time in at least one burner parameter or combustion chamber parameter can in particular be considered as such controlled variables. Alternating pressure in the combustion chamber and/or a combustion chamber acceleration in particular can be used as combustion chamber parameters. An alternating pressure at a burner flange for example can be used as a burner parameter.

The inventive regulating method allows the flame to be kept stable without the influence of the influencing variables on flame stability having to be known precisely from a quantitative standpoint.

The invention is based on the following novel concept. Instead of looking at the influencing variables to maintain flame stability, as in the prior art, in the inventive regulating method the burner stability limits themselves are considered. In other words the pilot gas mass flow is not varied as a function of the detected influencing variables but is changed when a burner stability limit is approached. The fact that the burner stability limit is being approached is hereby ascertained without quantitative knowledge of the influencing variables.

In the prior art the quantitative knowledge of the influencing variables is necessary to determine the burner stability limits, which change with the influencing variables, thus providing a pilot gas curve, which moves within the burner stability limits for all influencing variables. Since the influence of the influencing variables on the burner stability limits varies even for gas turbine plants of the same structure, as set out above in the introduction, for example due to differing ambient conditions, in the prior art it is necessary to set each gas turbine plant individually.

In contrast in the inventive method a quantitative knowledge of the relationship between the influencing variables and the position of the burner stability limits is not necessary, since the variation in the quantity of pilot gas to stabilize the flame can be made directly dependent on whether or not a burner stability limit is being approached and direct detection of an approach to the burner stability limits takes place. In addition the pilot gas is also used to boost the flame.

The change over time in the burner parameters or combustion chamber parameters mentioned above can be used to ascertain the approach to a burner stability limit. Alternating pressure at a burner flange is particularly suitable for this, since this responds earlier to an approach to a burner stability limit than the alternating pressure in the combustion chamber and combustion chamber acceleration. In principle however all the combustion chamber parameters mentioned above are suitable for ascertaining an approach to the burner stability limit.

The burner parameters and combustion chamber parameters (for example alternating pressure, combustion chamber acceleration or OH radiation) mentioned above represent oscillating variables, which are subjected to a fast Fourier transformation FFT and/or mean autocorrelations to evaluate the approach to flame instability. Fast Fourier transformation and/or mean autocorrelations are particularly suitable means for analyzing variables that change over time.

To determine autocorrelations the oscillating analog signals for a number of frequency bands are first filtered with amplitude precision and then converted from analog to digital or are first converted from analog to digital and then filtered with amplitude precision. The autocorrelations are calculated separately according to frequency bands at short time intervals based on 2-8 periods of the signal at the respective mean frequency of said frequency bands. The autocorrelations are then averaged separately according to frequency bands, in each instance together with a number from 10-100 adjacent successive autocorrelations from earlier time steps for the respective frequency bands. While the autocorrelations for the respective frequency bands are being averaged, their variances are also determined.

Transients are now formed for the individual frequencies or specific frequency bands from these frequency spectra and/or mean autocorrelations and/or variances of the autocorrelations. This can be done for example using a linear regression calculation. If individual transients or characteristic quantities formed therewith exceed a specific value, a regulating intervention takes place, for example reduction of output or change in quantity of pilot gas.

If characteristic quantities, formed from the absolute values of the mean autocorrelations and their transients as well as optionally also from the variances and transients of the variances of the autocorrelations, exceed specific values, a regulating intervention takes place, for example reduction of output or change in quantity of pilot gas. Significantly longer prior warning periods can be achieved by analyzing transients.

One or more combustion parameters can also be captured as controlled variables in addition to the at least one burner parameter and/or the at least one combustion chamber parameter in the regulating method. A suitable combustion parameter is for example the pollutant emission of the gas turbine plant, in particular the nitrogen oxide content ($NO_x$ content) and/or carbon monoxide content (CO content) of the combustion waste gas. The pressure drop across the combustion chamber is a similarly suitable combustion parameter.

In the inventive regulating method the absolute values of the burner parameters and combustion chamber parameters can also be captured for further support. Initially however the change in the burner parameters and combustion chamber parameters over time is considered in order to ascertain an approach to the burner stability limits.

At least one variable, which results in a change in gas turbine output, can be output as the manipulated variable and/or a variable, which results in a change in the corrected waste gas temperature of the combustion waste gases. In particular however a variable, which represents a change in the pilot gas mass flow, is output as the manipulated variable. A change in the gas turbine output or the corrected waste gas temperature generally takes place indirectly by way of a change in the absolute values of the air and main fuel supply as well as by way of a change in the ratio of air supply to main fuel supply. Variables, which result in a change in gas turbine output or the corrected waste gas temperature, should therefore be seen as being those variables in particular, which represent settings for absolute values of the air supply and/or main fuel supply and/or the ratio of air supply to main fuel supply. Changes in the gas turbine output can be used for example to keep the gas turbine plant within the emission range, without leaving the actual operating line of the plant. In contrast the change in pilot gas mass flow is used, if the operating line of the gas turbine plant is to be changed, to prevent the burner stability limits being reached. This can optionally also be combined with a change in the corrected waste gas temperature and/or gas turbine output.

The link between the captured controlled variable and the reference variable on the one hand and the manipulated variable on the other hand can in particular be made on the basis of a fuzzy logic. Alternatively however it is also possible to use a neural network or a fixed rule system. Fuzzy logic in particular allows a graduated response to be achieved as a function of the degree of approach to burner stability limits.

Generally the inventive regulating method makes it possible to prevent the burner stability limits being reached and exceeded in a reliable manner. Emergency tripping of the gas turbine plant, in other words rapid shutdown of the plant, because the burner stability limits have been reached, can thus be reliably avoided. Also the operating limits of the gas turbine plant can be better utilized. For example a high nitrogen oxide emission due to a high level of flame instability can be reduced or a higher corrected waste gas temperature (OTC Outlet Temperature Corrected) can be used, thereby improving the efficiency of the gas turbine plant. It is also possible to prevent or at least reduce a drop in the corrected waste gas temperature when the compressor intake temperature is below the temperature specified for this purpose. The compressor intake temperature here refers to the temperature of the air taken in by the compressor as it enters the compressor.

An inventive regulating device for regulating the operating line of a gas turbine plant comprises:
  At least one sensor for capturing a measurement variable and for outputting a measurement signal representing the measurement variable.
  At least one adjusting facility for influencing the air supply and/or the fuel supply to a combustion chamber of the gas turbine plant based on a manipulated variable.
  A regulator connected to the at least one sensor for receiving the measurement variable and the at least one adjusting facility for outputting the manipulated variable.

The regulator is designed to determine the manipulated variable based on the received measurement variable and its deviation from a reference variable. In the inventive regulating device at least one sensor is present, which is configured to capture the change in a burner parameter or combustion chamber parameter over time.

The inventive method can be implemented with the inventive regulating device, thereby optimizing the operating line of the gas turbine plant, in particular by better prevention of flame instabilities.

A sensor for capturing an alternating pressure in the combustion chamber and/or a sensor for capturing an alternating pressure at a burner flange and/or a sensor for capturing a combustion chamber acceleration in particular can be present as the sensor. At least one sensor connected to the regulator for capturing a combustion parameter, for example an emission measuring device, which can be used to determine for example the nitrogen oxide content or carbon monoxide content of the combustion waste gas, or a sensor for capturing an absolute value of a burner or combustion chamber parameter can additionally be present.

At least one fuel valve for influencing a fuel mass flow introduced into the combustion chamber can serve as the adjusting facility. Preferably at least one fuel valve is present for a main fuel line and one for the pilot fuel line.

As an alternative or preferably in addition to the at least one fuel valve the first vane ring of the compressor, in other words the vane ring facing the inflowing air on the inflow side, can serve as an adjusting facility. This vane ring generally has movable vanes, which can be used to vary the inflow cross section of the compressor available for the inflow of air.

If a sensor capturing the change in a burner parameter or combustion chamber parameter over time is configured to capture an oscillating measurement variable, a Fourier transformation unit can be assigned to the regulating device, said Fourier transformation unit being configured to carry out a fast Fourier transformation, and/or a computation unit for determining mean autocorrelation, in order to provide a suitable means for analyzing the oscillating measurement variable.

BRIEF DESCRIPTION OF THE DRAWINGS

Further features, characteristics and advantages of the present invention will emerge from the description which follows of an exemplary embodiment with reference to the accompanying figures, in which.

DETAILED DESCRIPTION OF INVENTION

Figure 1:
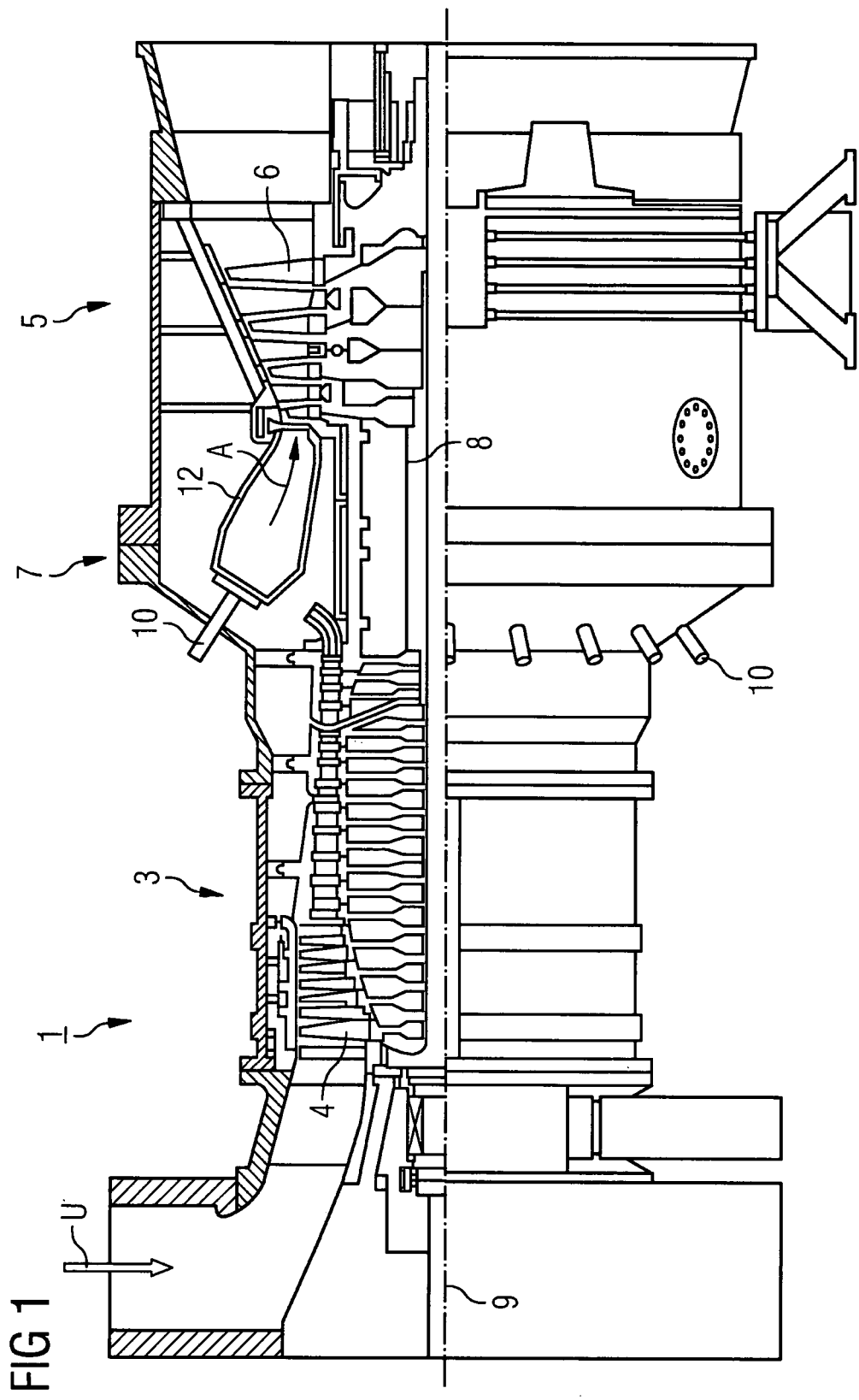
FIG. 1 shows a partial section of a side view of a gas turbine plant.

FIG. 1 shows a partial section of a side view of a gas turbine plant 1. It comprises a compressor section 3, a turbine section 5 and a burner section 7. In the compressor section 3 and in the turbine section 5 compressor blades 4 or turbine blades 6 are disposed on a common shaft 8, also referred to as a turbine rotor. The turbine rotor 8 is supported in such a manner that it can rotate about a central axis 9.

The burner section 7 comprises a number of burners 10, which open into a combustion chamber 12, which in turn opens into the turbine section 5. The combustion chamber 12 in the present exemplary embodiment is configured as an annular combustion chamber, in other words it extends in a circular manner around the turbine rotor 8.

During operation of the gas turbine plant 1 ambient air U is taken in by way of the compressor, compressed to a higher pressure and output into the burner section 7 as so-called compressor air. The size of the air mass flow entering the compressor can be influenced by adjusting the usable compressor inflow cross section using the first vane ring 32.

In the burner section 7 the compressor air enters the burner 10 and is mixed with a fuel supplied to the burner 10 by way of fuel lines 40*a*, 40*b* and combusted in the combustion chamber 12. The size of the fuel mass flows supplied can hereby be influenced by way of one or more adjusting valves 31*a*, 31*b*.

The combustion waste gases resulting during combustion form a working medium A, which is routed to the turbine section 5 and relaxes and cools there, transmitting a pulse to the blades 6, thereby causing the rotor 8 to rotate. The rotating rotor 8 drives the compressor on the one hand and on the other hand is coupled to a consuming component (not shown), for example an electric generator for generating power.

In order to prevent flame instabilities in the combustion chamber 12, the gas turbine plant 1 is equipped with a regulating device for regulating the operating line by influencing the fuel and/or air supply. This device is shown in the form of a block diagram in FIG. 2. The regulating device comprises a number of sensors 21, 23, 25, 27, 35, 37, disposed at different points inside and outside the gas turbine combustion chamber 12. The regulating device also comprises a regulator 29, to which the sensors 21, 23, 25, 27, 35, 37 are connected. Adjusting facilities, namely the adjusting valves 31 and the vane ring 32, are also present, being also connected to the regulator 29 and being configured to adjust the mass flows of the fuel supply and air supply to the burner 10.

In particular three adjustable fuel mass flows and one adjustable air mass flow are present in the gas turbine plant 1. If a gaseous fuel is used for example, one of the fuel mass flows is a so-called diffusion gas mass flow for operating the burner in diffusion mode, wherein the gas is injected directly into the flame present in the combustion chamber 12, without being mixed with air beforehand. A second fuel mass flow is a so-called premix gas mass flow for operating the burner in a premix mode, in other words a mode wherein the supplied gas is mixed with compressor air beforehand and this mixture is them combusted. Finally in the present exemplary embodiment a pilot gas mass flow is present as a further fuel mass flow, serving to boost the flame when the burner is operated in premix mode.

The sensors 21, 23, 25, 27, 35, 37 are used to capture various combustion chamber parameters and combustion parameters and forward them to the regulator 29 in the form of signals representing the capture measurement variable.

Figure 2:
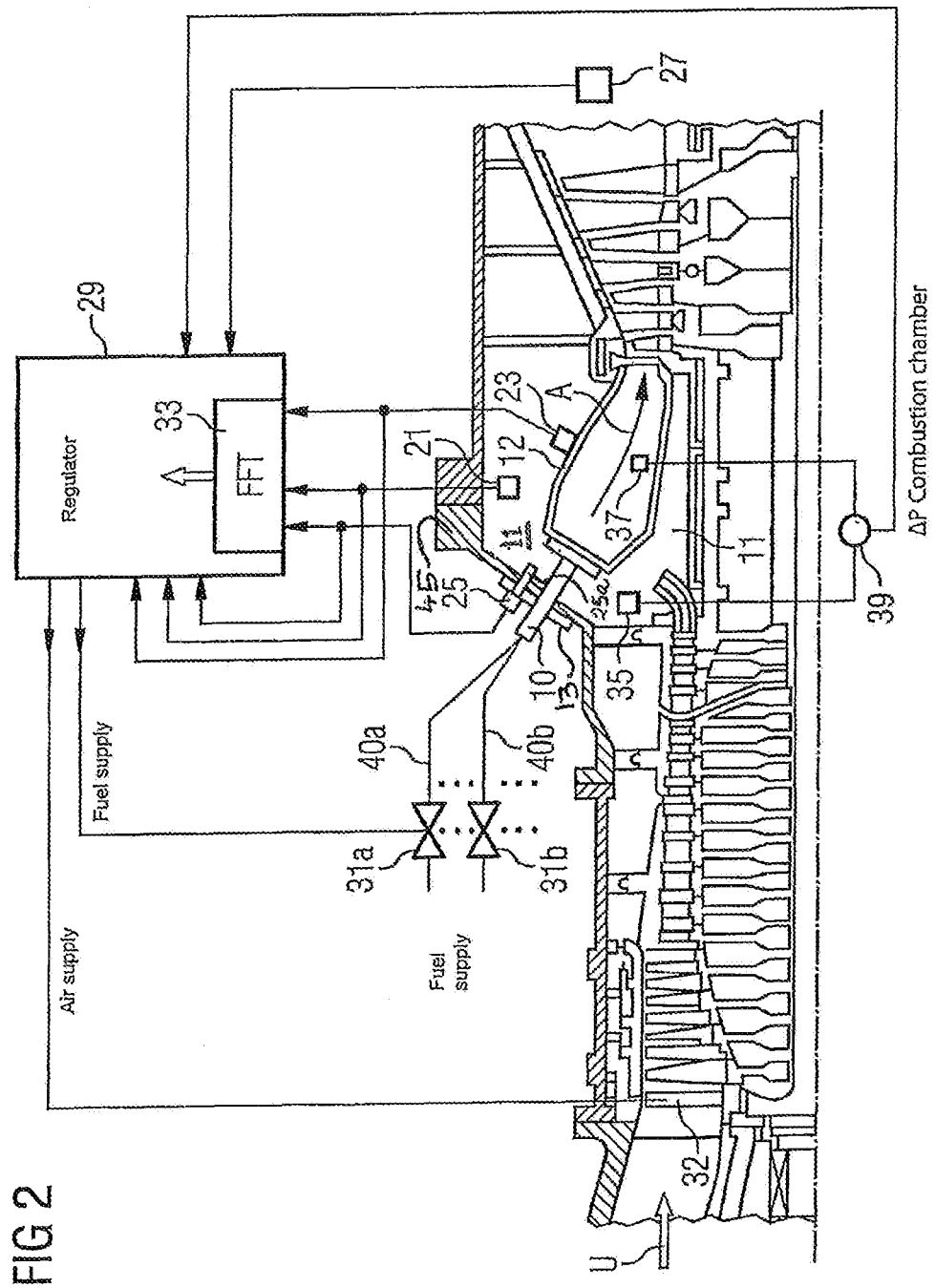
FIG. 2 shows a block diagram of an inventive regulating device.

As illustrated in FIG. 2, the gas turbine section has a gas turbine housing 45 which surrounds the combustion chamber 12 at least partially. A burner flange 13 disposed on the gas turbine housing 45. The sensor 21 is a pressure sensor disposed in the combustion chamber plenum 11 for capturing the alternating pressure in the combustion chamber plenum 11. The sensor 25 is a pressure sensor disposed at the burner flange 13 and extends through the burner flange 13, whereby a portion 25*a* of the sensor 25 faces the combustion chamber plenum 11 for capturing an alternating pressure at the flange 13 of the burner 10. The sensor 23 is an acceleration sensor for capturing the combustion chamber acceleration. It is disposed directly on the outside of the combustion chamber wall.

All three captured parameters, namely the alternating pressure in the combustion chamber, the alternating pressure at the burner flange and the combustion chamber acceleration are oscillating variables, which reflect vibrations in the combustion waste gases. In order to output their measurement signals, the pressure sensors 21 and 25 and the acceleration sensor 23 are therefore connected to a Fourier transformation unit 33 and/or computation unit for determining a mean autocorrelation (not shown) of the regulator 29, in which the measurement signals are analyzed on the basis of a Fourier transformation and in particular on the basis of what is known as a fast Fourier transformation. They are also connected directly to the regulator 29, in other words bypassing the Fourier transformation unit 33, in order also to be able to supply the absolute values of the measurement signals to the regulator 29. To determine the autocorrelations the oscillating analog signals for a number of frequency bands are first filtered with amplitude precision and then converted from analog to digital or they are first converted from analog to digital and then filtered with amplitude precision. The autocorrelations are calculated separately according to frequency bands at short time intervals based on 2-8 periods of the signal at the respective mean frequency of said frequency bands. The autocorrelations are then averaged separately according to frequency bands, in each instance together with a number from 10-100 adjacent successive autocorrelations from earlier time steps for the respective frequency bands. While the autocorrelations for the respective frequency bands are being averaged, their variances are also determined. Transients are now formed for the individual frequencies or specific frequency bands from these frequency spectra and/or mean autocorrelations and/or variances of the autocorrelation. This can be done for example using a linear regression calculation. If individual transients or characteristic quantities formed therewith exceed a specific value, a regulating intervention takes place, for example reduction of output or change in quantity of pilot gas. If characteristic quantities, formed from the absolute values of the mean autocorrelations and their transients as well as optionally also from the variances and transients of the variances of the autocorrelations, exceed specific values, a regulating intervention takes place, for example reduction of output or change in quantity of pilot gas. Significantly longer prior warning periods can be achieved by analyzing transients.

Based on the result of the Fourier transformation the regulator 29 can ascertain an approach to the burner stability limits of the gas turbine plant 1, with which for example stationary vibrations occur in the combustion gases. It is possible in particular, based on a measurement of the alternating pressure at the burner flange 13, after an analysis by the Fourier transformation unit 33, to determine the frequency of vibrations in the combustion waste gas. The alternating pressure at the burner flange 13 is therefore suitable as an early indicator of an approach to the burner stability limits and as a controlled variable for the regulator for regulating the air and/or fuel supply in such a manner that flame stability is maintained.

Combustion chamber acceleration responds later than the alternating pressure at the burner flange 13 to an approach to burner stability limits. It is therefore particularly suitable for protecting the gas turbine combustion chamber 12 from damage, if regulation of the air and/or fuel supply does not result in adequate flame stabilization. The combustion chamber acceleration is therefore an indicator for example of the occurrence of damage to ceramic heat shield elements, with which the combustion chamber 12 is lined to protect its supporting structure from the hot combustion waste gases. High levels of combustion chamber acceleration can result in cracks and even fractured in heat shield elements, with the result that they no longer fulfill this protection function to an adequate degree. Fractures can also cause fragments to become detached from the heat shield and get into the turbine section, resulting in very serious damage to the turbine. Emergency shutdown of the gas turbine plant can therefore be carried out for example based on combustion chamber acceleration, if the determined combustion chamber accelerations indicate that cracks or fractures are threatening in the heat shield elements.

As well as the alternating pressures in the combustion chamber 12 and at the burner flange 13 and combustion chamber acceleration, the pressure drop, also referred to as the pressure gradient, across the combustion chamber 12 can also be used to ascertain an imminent burner instability event. The pressure drop across the combustion chamber 12 drops immediately before burner instability, indicating the threat of the flame being drawn back into the burner 10 and therefore flame instability. Detection of a forthcoming burner instability event is therefore possible using a sensor arrangement for capturing the pressure gradient.

The pressure drop across the combustion chamber 12 takes place by means of a so-called $\Delta p$ measurement. In the present exemplary embodiment the $\Delta p$ measurement is carried out using two pressure sensors 35, 37, one 35 of which is disposed in the combustion chamber plenum 11 and the other 37 in the combustion chamber 12. A subtraction unit 39 connected to both pressure sensors 35, 37 and the regulator 29 forms the difference $\Delta p$ between the captured pressures and forwards this to the regulator 29 bypassing the Fourier transformation unit 33.

The regulator 29 initially responds to changes over time in the measurement variables captured by the sensors 21, 23, 25 rather than to their absolute values. If, after the analysis of the signals received from the sensors 21, 23, 25, the regulator 29 ascertains the approach to a burner stability limit, it outputs an adjusting signal to the adjusting valves 31$a$, 31$b$, . . . and/or to the compressor vane ring 32, prompting a change in at least one fuel mass flow and/or the air mass flow. In particular in this instance it outputs at least one adjusting signal to the fuel valve in the supply line of the pilot fuel, in order to optimize the operating line of the gas turbine plant again by way of a change in the pilot fuel mass flow, in other words to move it away from the burner stability limits. In this process the corrected waste gas temperature of the gas turbine plant and its output can be adjusted by influencing the main fuel mass flow and/or the air mass flow, in such a manner that the pollutant emission is kept to its optimal values or reset to these.

The adjusting valves 31$a$, 31$b$, . . . or the vane ring 32 can also can also act solely on the fuel mass flow and/or the air mass flow, in order to keep pollutant emission for example within the intended range by influencing the pilot gas mass flow and/or the gas turbine output and/or the corrected waste gas temperature, if said pollutant emission varies for example due to fluctuating influencing variables, for example a fluctuating ambient temperature, without optimizing the operating line of the gas turbine plant yet again.

It is possible to respond to increased pollutant values for example by acting on the pilot gas mass flow. Thus the pilot gas mass flow can be reduced, if the nitrogen oxide values in the waste gas flow are high or raised, if the carbon monoxide values in the waste gas are high. The pollutant values in the waste gas are captured in the present exemplary embodiment by means of an emission measuring device 27, which is disposed in the waste gas duct of the combustion chamber system and is connected to the regulator 29 bypassing the Fourier transformation unit 33.

In the present exemplary embodiment the regulator 29 operates on the basis of a fuzzy logic, to allow the most graduated response possible. It can however also operate with a fixed rule system, which is present for example as a functional relationship between the adjusting signal to be output and the incoming measurement signals or in the form of a table linking the incoming measurement signals to an outgoing adjusting signal. Finally it is also possible to deploy a regulator based on a neural network, with the result that the regulator is enabled to learn from prior regulation events.

The invention claimed is:

1. A regulating method for regulating the operating line of a gas turbine plant, comprising:
    capturing a controlled variable,
    comparing the captured controlled variable with a predetermined reference variable;
    determining a manipulated variable based on the comparison of the captured controlled variable with the reference variable, and
    outputting the determined manipulated variable to an adjusting facility influencing an air and/or fuel supply to a combustion chamber with a controlled variable, that indicates an approach of a combustion flame to a stability limit, being used as the controlled variable,
    wherein the captured controlled variable is the change in an alternating pressure over time captured by a sensor disposed at a burner flange comprising a burner, wherein the burner flange is disposed on an outer housing that surrounds at least partially the combustion chamber, wherein the sensor extends through the burner flange, whereby a portion of the sensor faces a combustion chamber plenum.

2. The regulating method as claimed in claim 1, wherein in addition to the change in an alternating pressure at the burner flange, the controlled variable is selected from the group consisting of: a change in a combustion chamber acceleration over time, and a combustion parameter.

3. The regulating method as claimed in claim 2, wherein the combustion parameter is a NOx content of a combustion waste gas or a CO content of the combustion waste gas or a pressure drop across the combustion chamber.

4. The regulating method as claimed in claim 1, wherein an absolute value of a burner parameter or a combustion chamber parameter is captured as a further controlled variable.

5. The regulating method as claimed in claim 1, wherein a variable, which results in a change in gas turbine output, is output as a manipulated variable or a variable, which results in a change in the corrected temperature of the combustion waste gases, is output as a manipulated variable or a variable, which results in a change in a pilot gas mass flow, is output as a manipulated variable.

6. The regulating method as claimed in claim 1, wherein
    the comparison of a captured controlled variable with a reference variable and/or
    the determination of the manipulated variable based on the comparison is/are effected by a fuzzy logic algorithm.

7. The regulating method as claimed in claim 1, wherein
    the comparison of a captured controlled variable with a reference variable and/or
    the determination of the manipulated variable based on the comparison is/are effected by means of a neural network.

8. The regulating method as claimed in claim 1, wherein
    the comparison of a captured controlled variable with a reference variable and/or
    the determination of the manipulated variable based on the comparison is/are effected by a comparison using a fixed rule system.

9. The regulating method as claimed in claim 1, wherein an oscillating variable is captured as the controlled variables that change over time.

10. The regulating method as claimed in claim 9, wherein the oscillating variable is subjected to a fast Fourier transformation and/or mean autocorrelation.

11. A regulating device for regulating the operating line of a gas turbine plant, comprising:
    a sensor module including at least a first sensor that captures a measurement variable and outputs a measurement signal representing the measurement variable;
    an adjusting facility that influences an air and/or fuel supply to a combustion chamber based on a manipulated variable, and
    a regulator connected to the sensor module that receives the measurement variable and the adjusting facility for outputting the manipulated variable, the regulator configured to determine the manipulated variable based on the received measurement variable and the deviation from a reference variable,
    wherein
        the first sensor is disposed at a burner flange comprising a burner, and is configured to capture the change in an alternating pressure over time at the burner flange, wherein the burner flange is disposed on an outer housing that surrounds at least partially the combustion chamber, wherein the first sensor extends through the burner flange, whereby a portion of the sensor faces a combustion chamber plenum.

12. The regulating device as claimed in claim 11, wherein the sensor module includes a second sensor that captures a combustion chamber acceleration.

13. The regulating device as claimed in claim 11, wherein an emission measuring device is connected to the regulator.

14. The regulating device as claimed in claim 11, wherein the sensor module includes a third sensor which is connected to the regulator for capturing an absolute value of a combustion chamber parameter.

15. The regulating device as claimed in claim 11, wherein a fuel valve that influences a fuel mass flow supplied for combustion in a combustion chamber or a compressor vane ring is the adjusting facility.

16. The regulating device as claimed in claim 11, wherein the regulator contains a regulating concept based on fuzzy logic, a neural network, or a fixed rule system.

17. The regulating device as claimed in claim 11, wherein the sensor module is configured to capture an oscillating measurement variable.

18. The regulating device as claimed in claim 17, further comprising
    a Fourier transformation unit configured to perform a fast Fourier transformation and/or
    a computation unit for determining mean autocorrelations.

* * * * *